(12) United States Patent
Watanabe

(10) Patent No.: US 7,870,676 B2
(45) Date of Patent: Jan. 18, 2011

(54) EYEGLASS FRAME SHAPE-MEASURING APPARATUS

(75) Inventor: Takahiro Watanabe, Itabashi-ku (JP)

(73) Assignee: Kabushiki Kaisha Topcon, Tokyo (JP)

( * ) Notice: Subject to any disclaimer, the term of this patent is extended or adjusted under 35 U.S.C. 154(b) by 86 days.

(21) Appl. No.: 12/382,794

(22) Filed: Mar. 24, 2009

(65) Prior Publication Data

US 2009/0241355 A1 Oct. 1, 2009

(30) Foreign Application Priority Data

Mar. 28, 2008 (JP) ............................. 2008-088201

(51) Int. Cl.
*G01B 5/20* (2006.01)

(52) U.S. Cl. ...................................... 33/200

(58) Field of Classification Search .................. 33/200, 33/507

See application file for complete search history.

(56) References Cited

U.S. PATENT DOCUMENTS

| | | | | |
|---|---|---|---|---|
| 5,615,486 | A * | 4/1997 | Igarashi et al. ................. | 33/200 |
| 6,325,700 | B1 | 12/2001 | Mizuno et al. | |
| 2003/0105612 | A1 | 6/2003 | Suzuki et al. | |
| 2008/0022539 | A1 | 1/2008 | Haddadi | |
| 2009/0007444 | A1* | 1/2009 | Shibata ........................ | 33/200 |
| 2009/0282688 | A1* | 11/2009 | Watanabe ..................... | 33/200 |
| 2010/0094589 | A1* | 4/2010 | Tesseraud ..................... | 33/200 |

FOREIGN PATENT DOCUMENTS

| | | |
|---|---|---|
| EP | 1 050 373 | 11/2000 |
| EP | 1 974 854 | 10/2008 |
| FR | 2 898 690 | 9/2007 |
| JP | 10-328992 | 12/1998 |
| JP | 3695988 | 9/2005 |

OTHER PUBLICATIONS

European Search Report issued Jun. 5, 2009 in EP 09 15 6491 corresponding to the present U.S. application.

* cited by examiner

*Primary Examiner*—G. Bradley Bennett
(74) *Attorney, Agent, or Firm*—Wenderoth, Lind & Ponack, L.L.P.

(57) ABSTRACT

An eyeglass frame shape-measuring apparatus is provided in which deformation of the frame shape is determined at each measurement point based on the actual measurement values and even in the case where the frame shape changes in a direction that differs from prediction, measurement of the lens frame shape of the eyeglass frame can be performed precisely, the eyeglass frame shape-measuring apparatus that measures a shape of a lens frame of an eyeglass frame includes a feeler 37 for a lens frame, a drive motor 6 and a control device (FIG. 11) for measurement and calculation of the shape of the lens frame, the control device separates a whole circumference of the shape of the lens frame into a plurality of measuring points and obtains as frame shape information (θn, ρn, Zn) frame shape values (ρn, Zn) measured at each measuring point by moving the feeler for the lens frame so that the feeler 37 is in sliding contact along the shape of the lens frame, the control device compares a frame shape value at one measuring point with an already measured frame shape value and determines an amount of pressing pressure in correspondence to an amount change of a frame shape detected at the one measuring point, in the case where the pressing pressure value differs from a preliminarily set pressing pressure value, the control device resets the pressing pressure value and measures again the frame shape at the already measured measuring point.

8 Claims, 13 Drawing Sheets ial # EYEGLASS FRAME SHAPE-MEASURING APPARATUS

PRIORITY CLAIM

This application claims priority from Japanese Patent Application No. 2008-088201, filed with the Japanese Patent Office on Mar. 28, 2008, the contents of which are incorporated herein by reference in their entirety.

BACKGROUND OF THE INVENTION

1. Field of the Invention

The present invention relates to an eyeglass frame shape-measuring apparatus that measures a lens frame shape of an eye glass frame.

2. Description of the Related Art

Conventionally, an apparatus for measuring an eyeglass frame shape is known (for reference, see JP3695988B). The apparatus predicts variations of a moving radius of an unmeasured part based on changes in information of an already measured moving radius. Then the apparatus controls driving of a drive motor in correspondence to the predicted variations of the moving radius. Next, the apparatus changes a pressing pressure of a feeler that measures a shape of an eyeglass frame. Hereby, the term "moving radius" means changes in distance from a geometrical center or optical center of the eyeglass frame to a periphery of an internal side of the eyeglass frame.

However, in such a conventional apparatus for measuring eyeglass frame shapes, a method is adopted in which variations in a moving radius of an unmeasured part are predicted based on changes in information of an already measured moving radius. This method is fine in the case if the moving radius of the unmeasured part changes as predicted. But as a variety of shapes of eyeglass frames have recently emerged, there are cases in which the moving radius changes in a direction that differs from prediction. Therefore, in the case the moving radius changes in a direction that differs from prediction, it is problematic that the pressing pressure changes in a direction that reversely deforms the eyeglass frame so that shape measurement is possibly not correctly done.

SUMMARY OF THE INVENTION

The present invention is made to solve the above described problems. An object of the present invention is to provide an apparatus for measuring a shape of an eyeglass frame that performs deformation judgment of frame shapes at each measurement point based on actually measured values and can precisely measure a shape of a lens frame of an eyeglass frame even including the cases in which the frame shape changes in a direction that differs from prediction.

To accomplish the above object, an eyeglass frame shape-measuring apparatus that measures a shape of a lens frame of an eyeglass frame according to an embodiment of the present invention includes a feeler for a lens frame that measures a direction of a moving radius of the lens frame, a drive motor for applying a certain amount of pressing pressure to the feeler for the lens frame as well as a control device for measurement and calculation of the shape of the lens frame. The control device separates a whole circumference of the shape of the lens frame into a plurality of measuring points and obtains as frame shape information frame shape values measured at each measuring point by moving the feeler for the lens frame so that the feeler is in sliding contact along the shape of the lens frame. The control device compares a frame shape value at one measuring point with an already measured frame shape value and determines an amount of pressing pressure in correspondence to an amount change of a frame shape detected at the one measuring point. In the case where the pressing pressure value differs from a preliminarily set pressing pressure value, the control device resets the pressing pressure value and measures again the frame shape at the already measured measuring point.

DETAILED DESCRIPTION OF THE PREFERRED EMBODIMENTS

Preferred embodiments of an eyeglass frame shape-measuring apparatus of the present invention are described in detail hereinbelow with reference to the accompanying drawings.

Embodiment 1

A general constitution of an eyeglass frame shape-measuring apparatus, a measuring mechanism and a slider driving mechanism of the eyeglass frame shape-measuring apparatus according to an embodiment 1 is described based on FIG. 1 through FIG. 5D.

Figure 1:
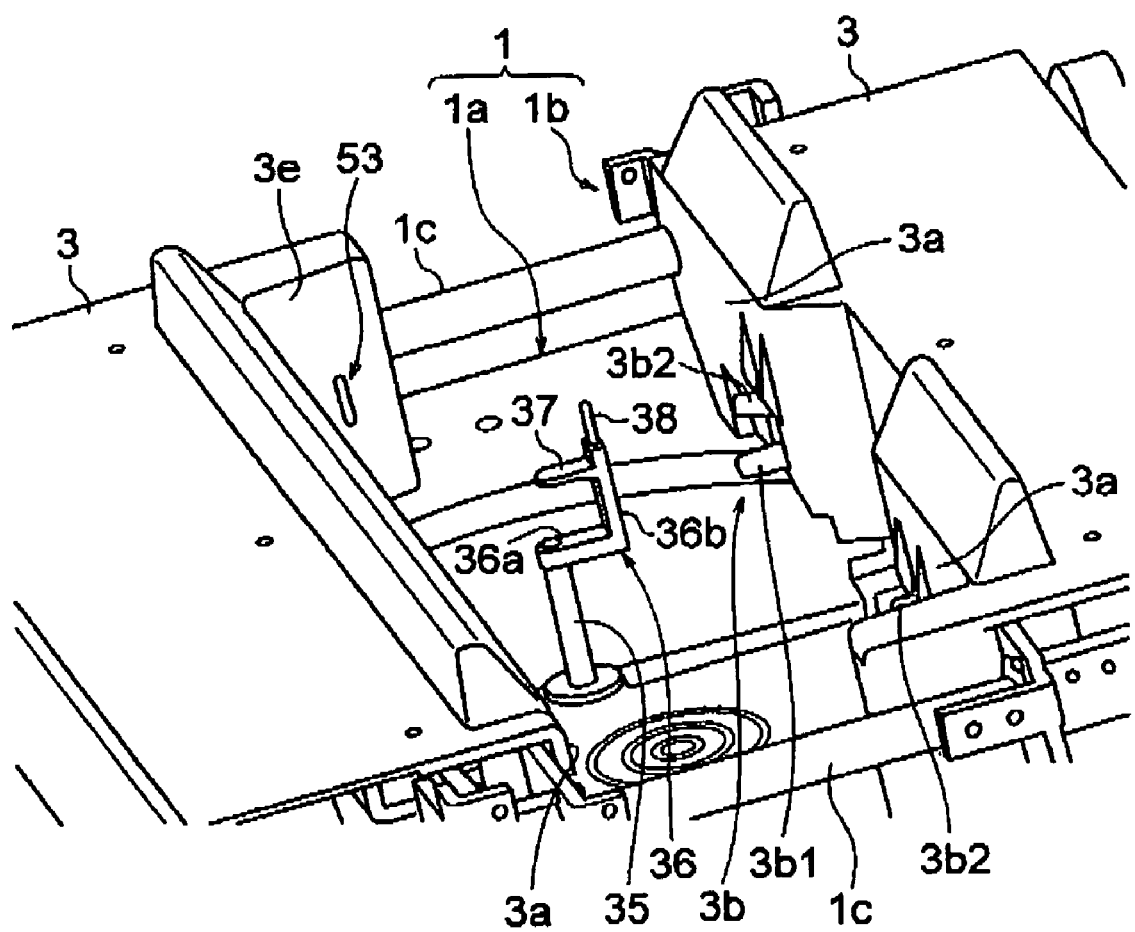
FIG. 1 is a partially schematic perspective view that illustrates an eyeglass frame shape-measuring apparatus of an embodiment 1.
Figure 2:
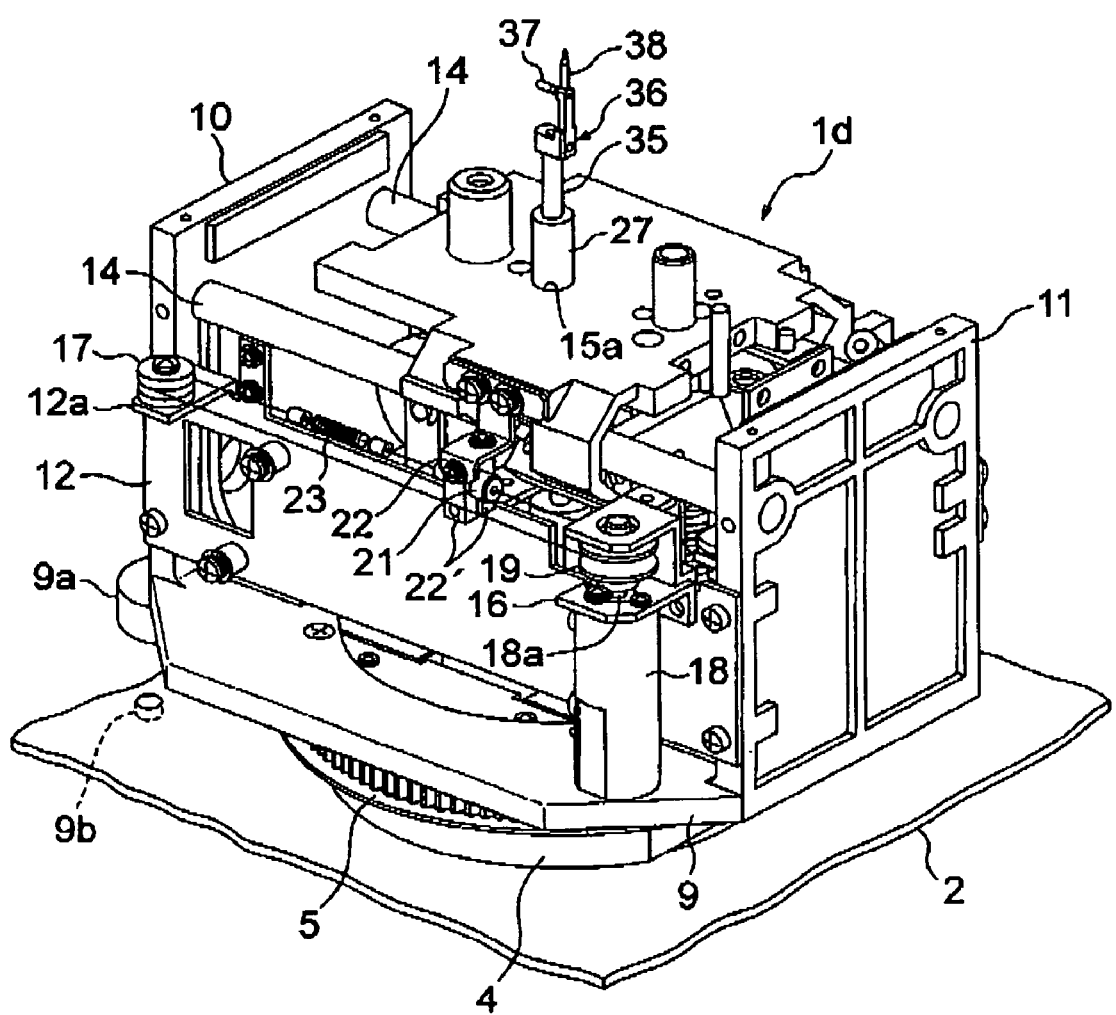
FIG. 2 is a perspective view that illustrates a measuring mechanism of the eyeglass frame shape-measuring apparatus of the embodiment 1.

In FIG. 1, the eyeglass frame shape-measuring apparatus includes a main body 1. The main body 1 includes a case part 1a for storing a measuring mechanism situated at a lower part and a lens frame holding mechanism 1b disposed at an upper part of the case part 1a. In addition, a base 2 illustrated in FIG. 2 is disposed at a bottom part within the case part 1a of FIG. 1.

The lens frame holding mechanism 1b includes a parallel pair of guide rods 1c and 1c fixed to the case part. Besides, a pair of slide frames 3 and 3 is held in the pair of guide members 1c and 1c to be able to mutually come close or move apart from each other. The slide frames 3 and 3 mutually come close to each other in a direction and are urged in the direction by a not-illustrated coil spring or the like. The slide frames 3 and 3 are mutually opposed and include longitudinal walls 3a and 3a. The longitudinal walls 3a and 3a make a lens frame (not illustrated) of a glass to come into contact thereof. The slide frames 3 and 3 also include a lens frame holding device 3b that holds the lens frame. The lens frame holding device 3b includes a holding stick 3b1 of a lower part side protruded from the longitudinal wall 3a and a holding stick 3b2 of an upper side fitted on the slide frame 3 which is openable and closable from the upper side against the holding stick 3b1. The lens frame holding device 3b is disposed respectively against a left and a right lens frame of a not-illustrated glass. In addition, a constitution disclosed in, for example, JP H10-328992A or other well-known prior arts can be adopted for the lens frame holding mechanism 1b as such. Therefore, detailed descriptions of the lens frame holding mechanism 1b are abbreviated.

As illustrated in FIG. 2 through FIG. 5, a measuring mechanism 1d is disposed on the base 2. The measuring mechanism 1d includes a base supporting member 4 fixed on the base 2. A driven gear 5 of a large diameter is fitted on the base supporting member 4 and is capable of free horizontal rotations with a vertical axis as the center. In addition, a drive motor 6 illustrated in a frame format in FIG. 5A is mounted adjacent to the driven gear (timing gear) 5 on the base 2. A pinion (timing gear) 7 is fixed on an output axis 6a of the drive motor 6. A timing belt 8 is chained around the pinion 7 and the driven gear 5.

Then when the drive motor 6 is operated, rotations of the output axis 6a of the drive motor 6 are delivered to the driven gear 5 via the pinion 7 and the timing belt 8 so that the driven gear 5 is rotated. In addition, a two phase stepping motor or the like is for example used as the drive motor 6.

As illustrated in FIG. 2 through FIG. 5, a rotational base 9 is fixed in integration on the driven gear 5. An original point detection device, for example, a photosensor 9a is fitted on the rotational base 9. In this case, a light emitting device 9b for indicating a position of the original point is for example disposed on the base 2. Line shaped or point shaped light beams are irradiated upwardly from the light emitting device 9b as a mark for the original point. When the photo sensor 9a detects such tight beams as the mark for the original point, the position of the original point of horizontal rotations of the rotational base 9 can be set. In addition, a transmission type photosensor and a reflection type photosensor or well known prior arts of a proximity sensor or the like can be adopted as the original point detection device.

Figure 3:
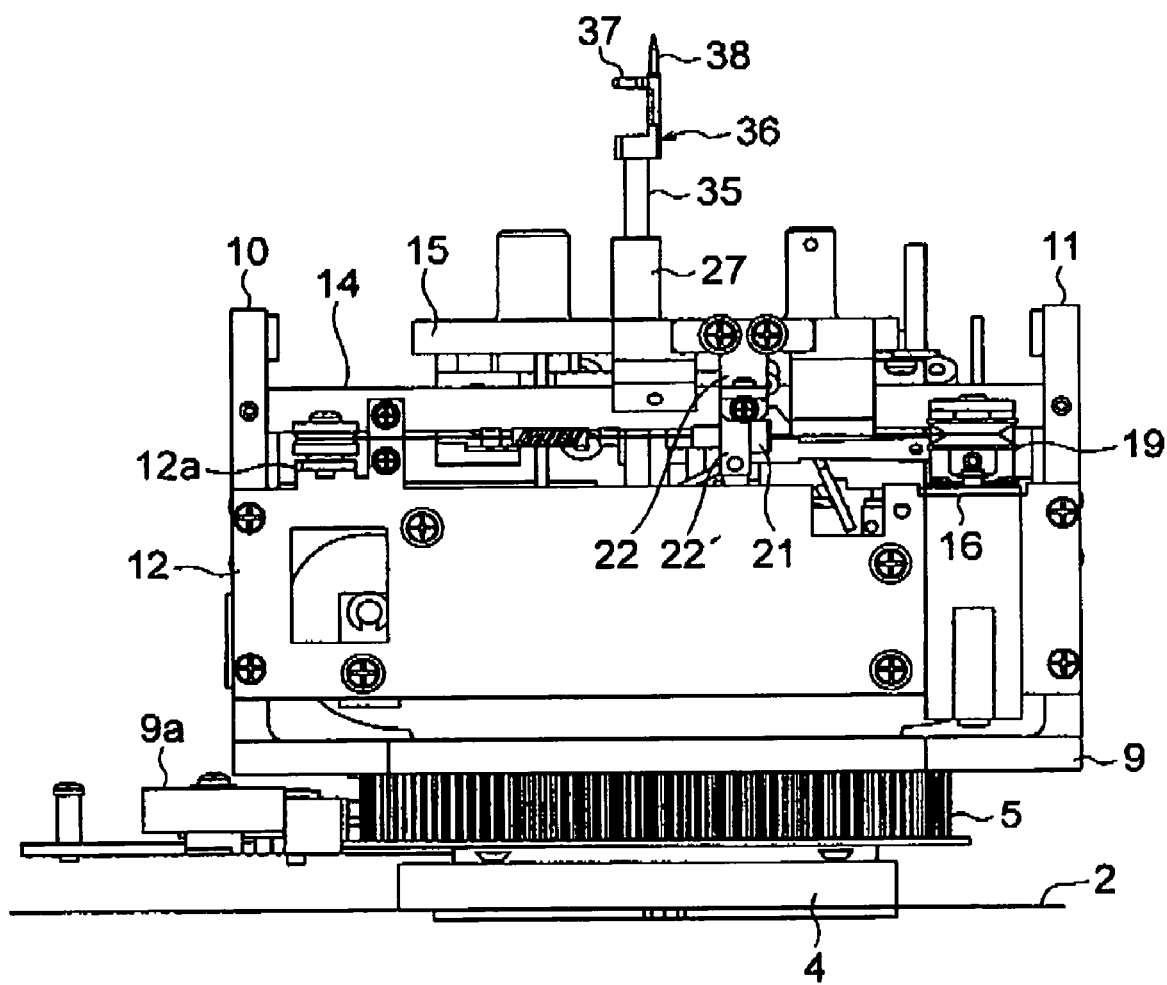
FIG. 3 is a front view that illustrates the measuring mechanism of the eyeglass frame shape-measuring apparatus of the embodiment 1.
Figure 4:
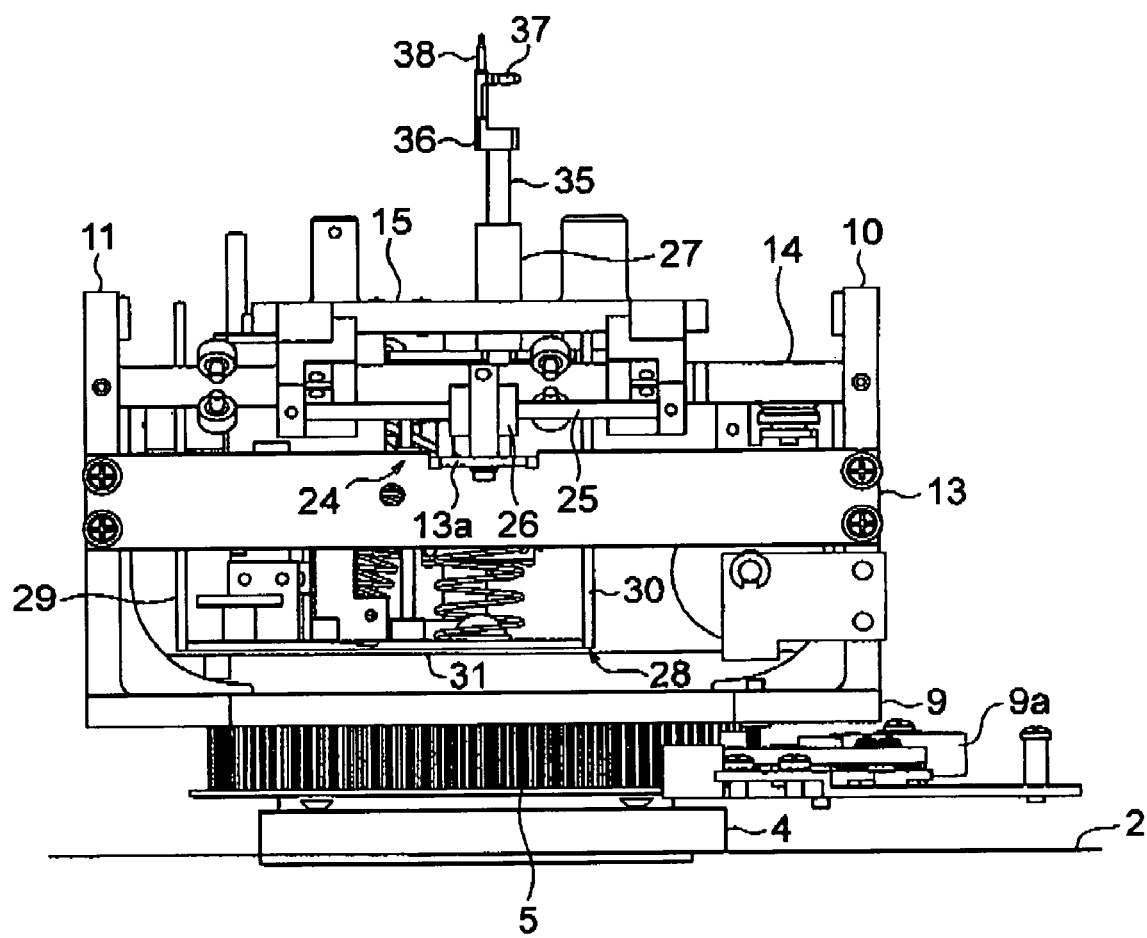
FIG. 4 is a back view that illustrates the measuring mechanism of the eyeglass frame shape-measuring apparatus of the embodiment 1.
Figure 5:
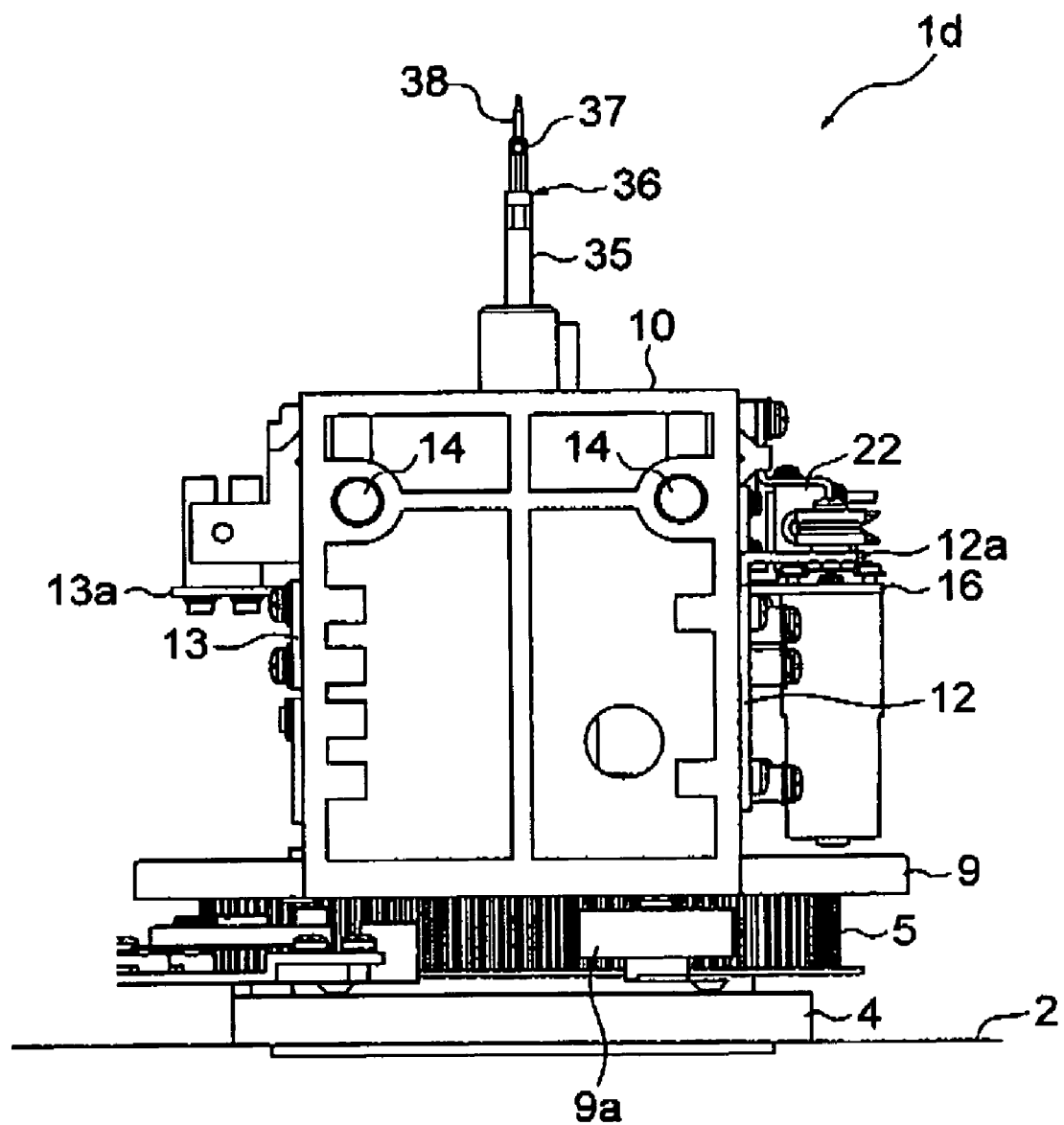
FIG. 5 is a right side view that illustrates the measuring mechanism of the eyeglass frame shape-measuring apparatus of the embodiment 1.
Figure 5A:
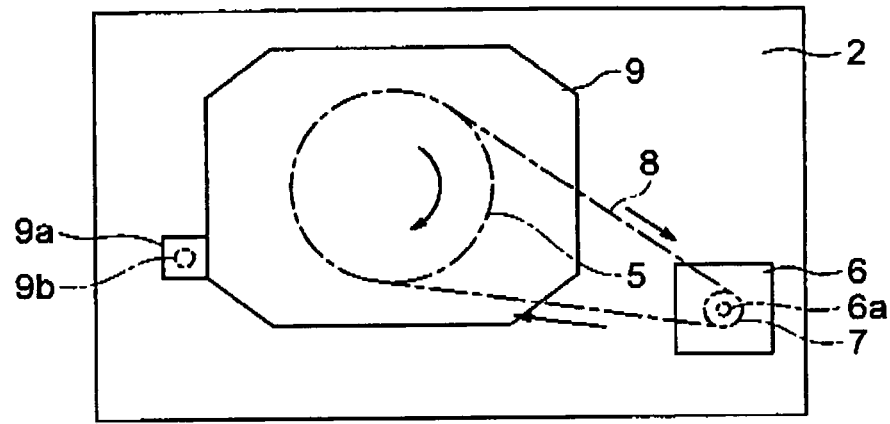
FIG. 5A is a diagram that illustrates in a frame format a driving device of a rotational base of the measuring mechanism of the eyeglass frame shape-measuring apparatus of the embodiment 1.

Furthermore, as illustrated in FIG. 2 and FIG. 4, a pair of mutually facing and parallel rail fixing plates 10 and 11 extending upwardly and downwardly is fixed in integration at both end parts of a longitudinal direction of the rotational base 9. As illustrated in FIG. 3, end parts of a longitudinal direction of a side plate 12 are respectively fixed to a side part of the rail fixing plate 10 and a side part of the rail fixing plate 11. As illustrated in FIG. 4, end parts of a longitudinal direction of a side plate 13 are respectively fixed to another side part of the rail fixing plate 10 and another side part of the rail fixing plate 11.

Between upper parts of the facing rail fixing plate 10 and 11, as illustrated in FIG. 2 through FIG. 4, a pair of mutually parallel and shaft shaped guide rails 14 and 14 is disposed horizontally. Both end parts of each guide rail 14 are fixed to the rail fixing plate 10 and 11. A pair of slider 15 is held to be able to move forwardly and backwardly in a longitudinal direction on guide rails 14 and 14.

Furthermore, on the side plate 12, as illustrated in FIG. 2 and FIG. 3, a pulley support plate part 12a protruding laterally in a horizontal direction and in close contact with the rail fixing plate 10 is shaped integrally by replication. Also on the side plate 12, a bracket 16 for motor mounting use is fixed and in close contact with the rail fixing plate 11.

Figure 5B:
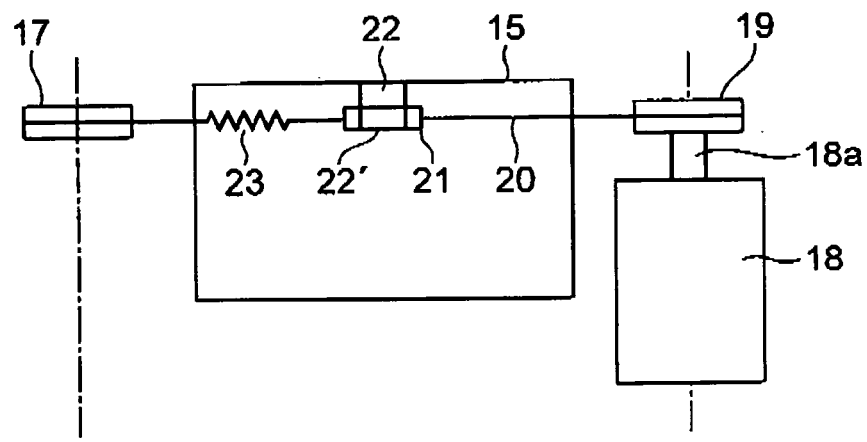
FIG. 5B is a diagram that illustrates in a frame format a slider driving mechanism of the eyeglass frame shape-measuring apparatus of the embodiment 1.
Figure 5C:
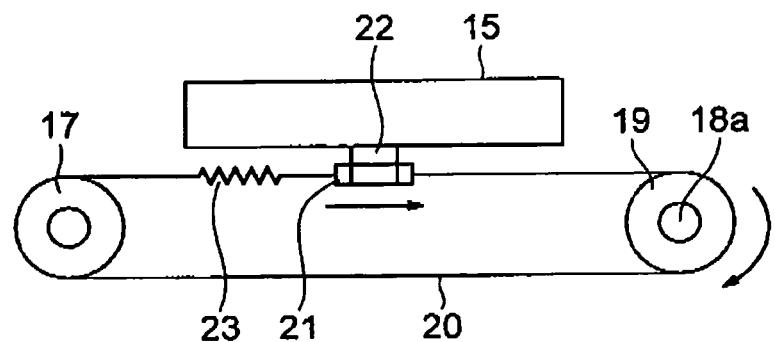
FIG. 5C is a plain view that illustrates the slider driving mechanism of the eyeglass frame shape-measuring apparatus of the embodiment 1.

In addition, in the pulley support plate part 12a, a driven pulley 17 is fitted on with a shaft line extending upwardly and downwardly as a center and capable of free horizontal rotation. In the bracket 16, an upper end part of a drive motor 18 for moving the slider is fixed. For example, a DC motor or the like is used as the drive motor 18. In addition, an output shaft 18a of the drive motor 18 has a shaft line directed upwardly and downwardly. As illustrated in FIG. 5B and FIG. 5C, a drive pulley 19 is fitted onto the output shaft 18a.

A circular shaped wire 20 is chained around both pulleys 17 and 19. A part in the vicinity of one end part of the wire 20 is held by a shaft shaped wire holding member 21. The wire holding member 21 is fixed to the slider 15 via brackets 22 and 22'. In addition, both end parts of the wire 20 are connected via a coil spring 23. Therefore, when the drive motor 18 is rotated normally or reversely, the drive shaft 18a and the drive pulley 19 are rotated normally or reversely so that the slider 15 is moved leftward or rightward within the FIG. 3.

Figure 5D:
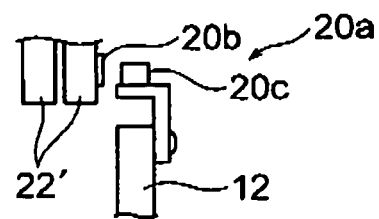
FIG. 5D is a general descriptive diagram that illustrates a detection device for a slider original point of the slider driving mechanism of the eyeglass frame shape-measuring apparatus of the embodiment 1.

Between the bracket 22' and the side plate 12, as illustrated in FIG. 5D, an original point sensor 20a for detecting an original point of a movement position (movement amount) of the slider 15 is interposed. A reflective type sensor or the like is for example used as the original point sensor 20a. The original point sensor 20a includes a reflective plate 20b in which a slit shaped reflective surface (not illustrated) extending upwardly and downwardly is disposed. The original point sensor also includes a reflective type photosensor 20c having a light emitting device and a light receiving device. In addition, the reflective plate 20b is disposed on the bracket 22'. The photosensor 20c is disposed on the side plate 12. In addition, well known prior arts such as a transmission type photosensor and a proximity sensor or the like can be adopted as the original point sensor 20a.

At a central part of a longitudinal direction of the side plate 13, as illustrated in FIG. 4, a supporting plate part 13a protruding laterally in a horizontal direction is integrally shaped by replication. Between the side plate 13 and the slider 15, as illustrated in FIG. 4, a linear scale 24 is interposed as a moving radius detection sensor that detects positions of horizontal directional movements of the slider 15 which moves towards an extending direction of the guide rail 14.

The linear scale 24 includes a shaft shaped main scale 25 held by the slider 15 to be parallel to the guide rail 14 and a detection head 26 fixed to the supporting plate part 13a that reads out positional information of the main scale 25. The detection head 26 detects positions of horizontal directional movements of the slider 15 from information of the main scale 25 for positional detection use (information for movement amount detection use). For example, a well known magnetic type or optical type linear scale can be used as the linear scale 24. For example, in the case of a magnetic type linear scale, a magnetic pattern of magnetic poles S, N is disposed alternatively at minute intervals in a shaft line direction of the main scale 25 as information for positional detection use (information for movement amount detection use). Then this magnetic pattern is detected using the detection head 26 (a head for detecting magnetic changes so that a movement amount (a movement position) of the slider 15 can be detected. In addition, in the case of an optical type linear scale, the main scale 25 is formed into a plate shape and slits of a minute interval are disposed in a longitudinal direction of this main scale 25. A light emitting device and a light receiving device are disposed so that the main scale 25 is interleaved in-between. Then light from the light emitting device is detected by the light receiving device via slits of the main scale 25. A movement amount (a movement position) of the slider 15 can be detected by calculating the number of slits.

A through hole 15a is formed, as illustrated in FIG. 2, on an approximately central part of the slider 15. A guide barrel 27 extending upwardly and downwardly is inserted through the through hole 15a. A supporting frame 28 is disposed, as illustrated in FIG. 4, at a lower side of the slider 15. The supporting frame includes longitudinal frames 29 and 30 with their upper end parts held by the slider 15 and a lateral plate (bottom plate) 31 fixed to lower end parts of the longitudinal frames 29 and 30.

A constitution of the elevator mechanism and a constitution of the feeler of the eyeglass frame shape-measuring apparatus of the embodiment 1 are described based on FIG. 6 through FIG. 10.

Figure 8:
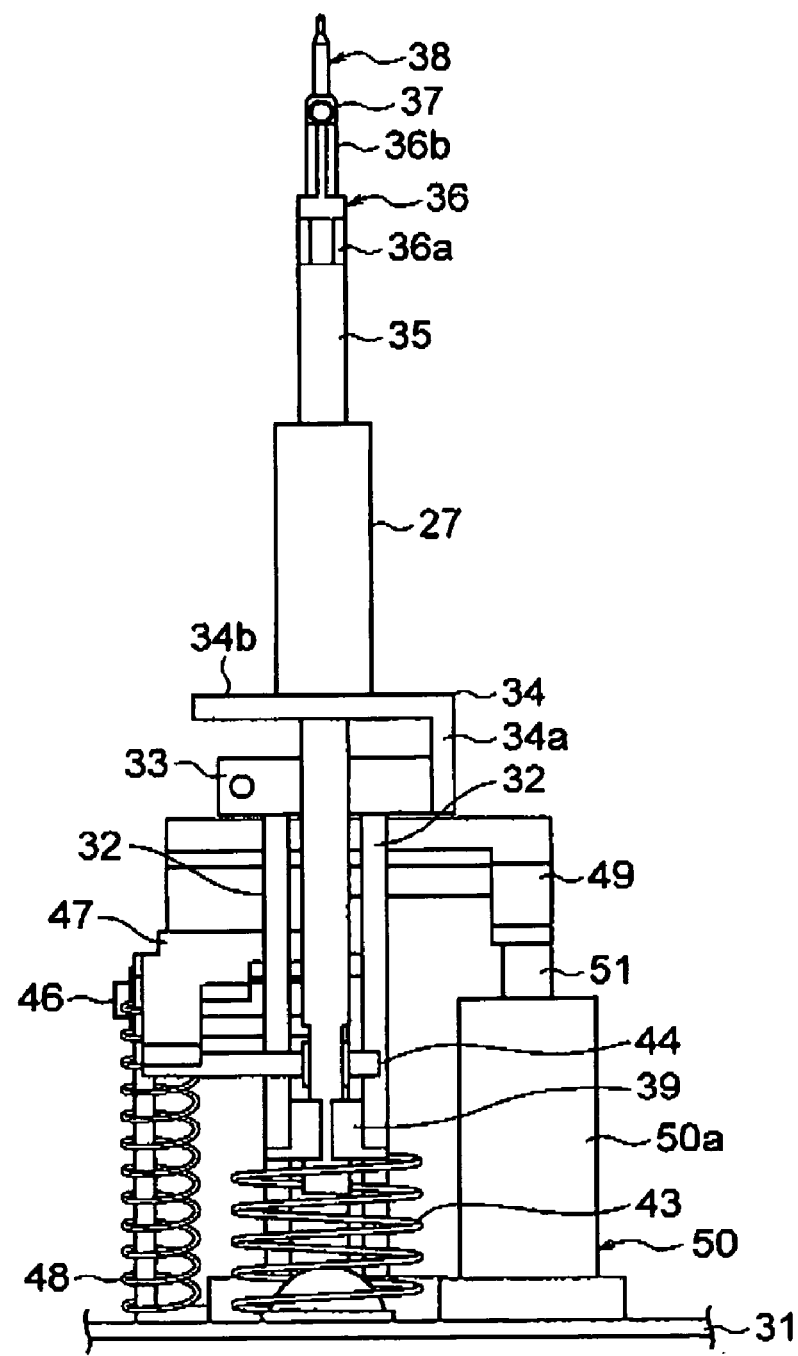
FIG. 8 is a left side view that illustrates the measurement of the lens frame by the elevator mechanism of the eyeglass frame shape-measuring apparatus of the embodiment 1.

As illustrated in FIG. 8, lower end parts of a pair of shaft shaped supporting members 32 and 32 disposed mutually parallel and extending upwardly and downwardly are fixed to the lateral plate (bottom plate) 31. A holding member 33 is fixed to upper end parts of these supporting members 32 and 32. A longitudinal wall 34a of a guide supporting member 34 with an "L" letter shaped side surface formed thereof is fixed to the holding member 33. A lower end part of the guide barrel 27 is fixed onto a lateral wall (superior wall) of the guide supporting member 34.

Figure 9:
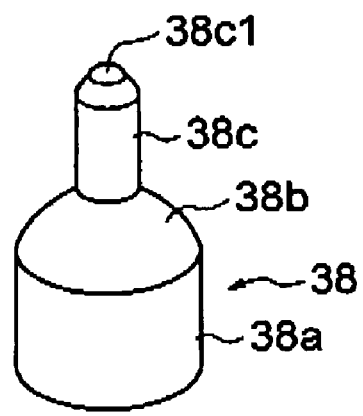
FIG. 9 is a partially enlarged perspective view that illustrates a feeler for a lens frame of the eyeglass frame shape-measuring apparatus of the embodiment 1.
Figure 10:
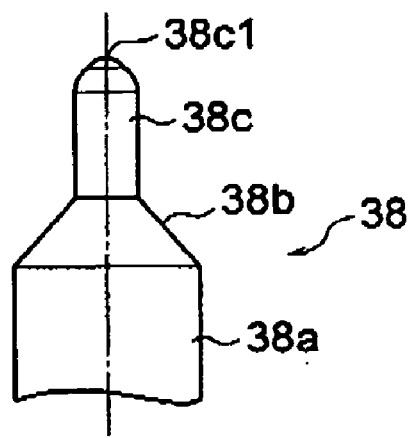
FIG. 10 is a side view that illustrates a feeler for a lens frame of the eyeglass frame shape-measuring apparatus of the embodiment 1.

In addition, a feeler shaft 35 extending upwardly and downwardly is fitted into the guide barrel 27 and held thereby with free capability of upward and downward movement. A feeler mounting member 36 is disposed integrally on an upper end part of the feeler shaft 35. The feeler mounting member 36 is "L" letter shaped to include a mounting part 36a fitted vertically onto the upper end part of the feeler shaft 35 and a vertical part 36b extending upwardly from the mounting part 36a. A feeler 37 for a lens frame is disposed integrally on an upper end part of the vertical part 36b and parallel to the mounting part 36a In addition, as illustrated in FIG. 9 and FIG. 10, a feeler 38 for a lens frame protruding upwardly is disposed integrally on an upper end of the feeler mounting member 36. The feeler 38 for the lens frame includes a shaft shape-measuring part 38a fitted on the upper end of the vertical part 36b of the feeler mounting member 36 and parallel to a shaft line of the feeler shaft 35, a tapered part 38b that tapers off to a point and disposed on an upper end part of the shaft shape-measuring part 38a and a shaft part 38c with an engaging hole of a small diameter provided in a coupled manner to an upper end of the tapered part 38b. In addition, an upper end (pointy end) part of the shaft part 38c with the engaging hole is half spherical shaped. A pointy end 38c1 thereof matches a shaft line of the shaft shape-measuring part 38a.

Figure 6:
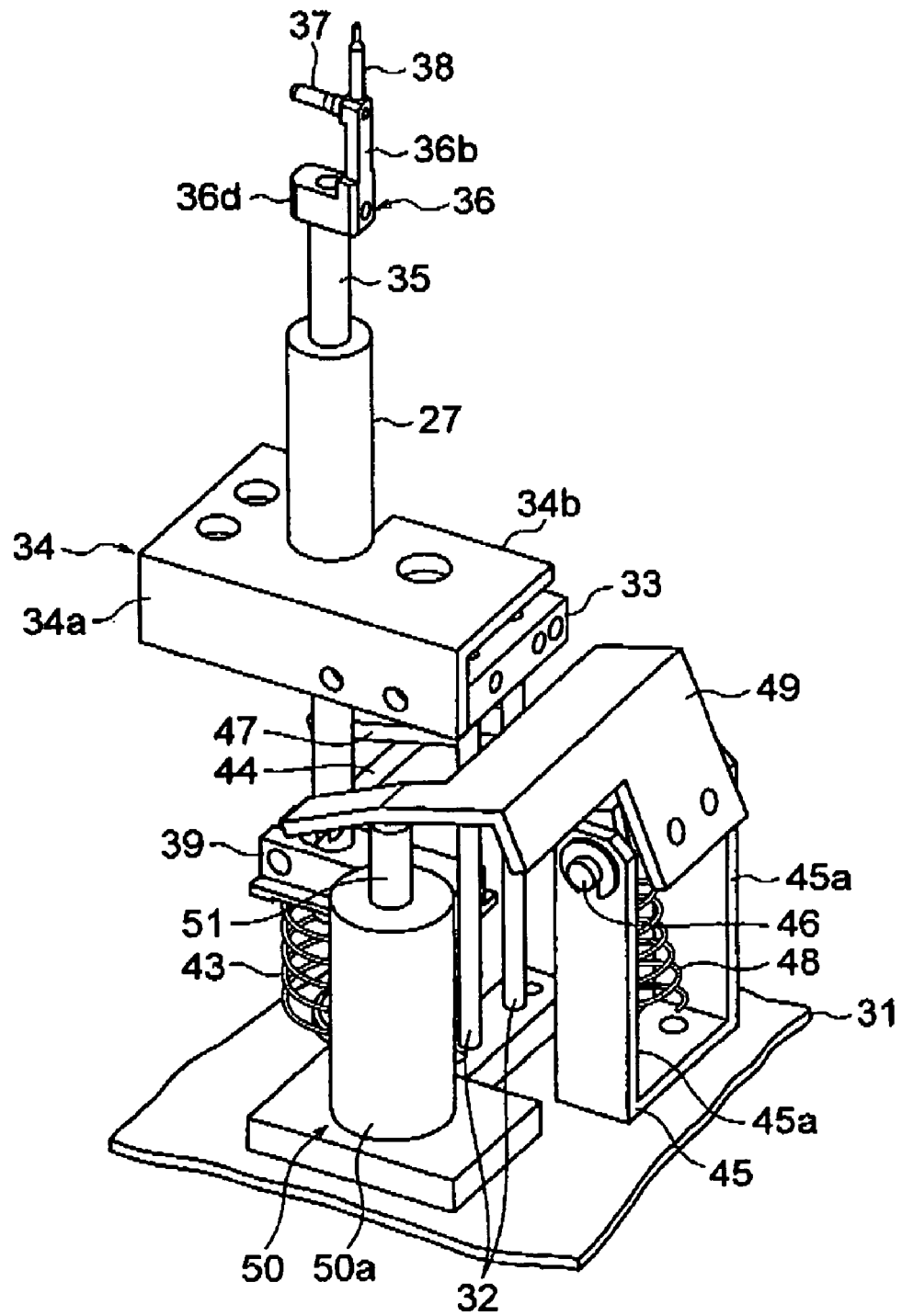
FIG. 6 is a perspective view that illustrates an elevator mechanism of a feeler of the eyeglass frame shape-measuring apparatus of the embodiment 1.
Figure 7:
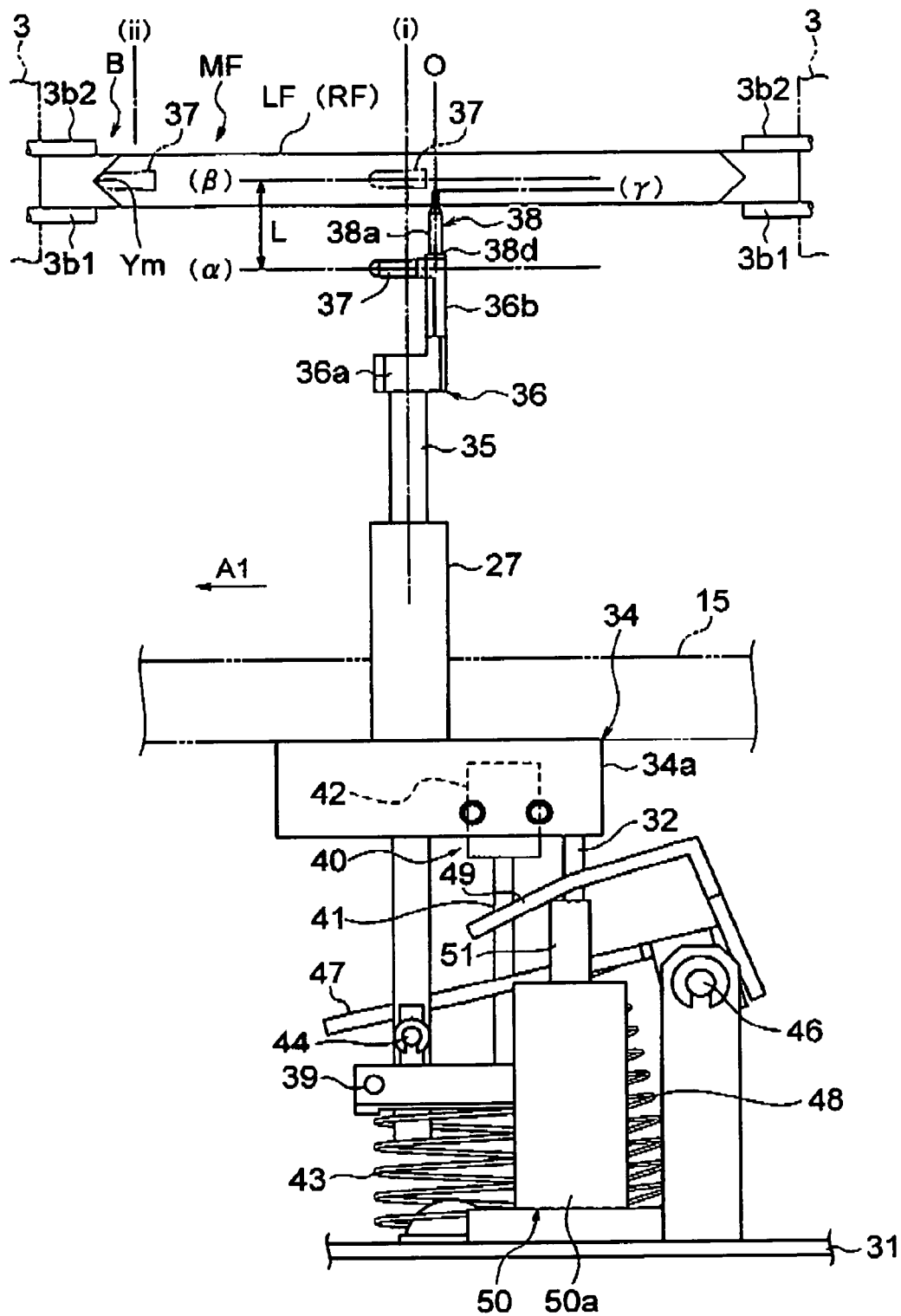
FIG. 7 is a front view that illustrates a measurement of a lens frame by the elevator mechanism of the eyeglass frame shape-measuring apparatus of the embodiment 1.

As illustrated in FIG. 6 through FIG. 8, a bracket 39 is fixed to a lower end part of the feeler shaft 35. In addition, between the bracket 39 and the guide supporting member 34, as illustrated in FIG. 7, a linear scale 40 that detects positions of movements in upward and downward directions (=Z shaft value) is interposed as a height detection sensor.

The linear scale 40 includes a shaft shaped main scale 41 disposed parallel to the feeler shaft 35 in an upward and downward direction and a detection head 42 that detects a position of a movement of the feeler 37 and the feeler 38 towards an upward and downward direction from an amount of movement by the main scale 41 in an upward and downward direction. An upper end part of the main scale 41 is fixed to the holding member 33. Besides, a lower end part of the main scale 41 is fixed to (or held by) the bracket 39. In addition, the detection head 42 is held by the holding member 33. In the same way to the above described linear scale 24, a magnetic type or an optical type linear scale can be adopted as the linear scale 40.

As illustrated in FIG. 6 through FIG. 8, a coil spring 43 is interposed between the bracket 39 and the lateral plate (bottom plate) 31 to urge the feeler shaft 35 upwardly by a spring. Furthermore, an engaging shaft 44 is fitted in the vicinity of the lower end part of the feeler shaft 35. The engaging shaft 44 is situated upward to the bracket 39 and orthogonal to the feeler shaft 35. In addition, as illustrated in FIG. 6, a bracket 45 formed with a "U" character shape is fixed on the lateral plate (bottom plate) 31. Both end parts of a supporting shaft 46 is held on opposing walls 45a and 45a of the bracket 45 and capable of free rotation around a shaft line. A hold down lever 47 is fixed onto the supporting shaft 46. The hold down lever 47 comes into contact with an upper part of the engaging shaft 44. In addition, a tension coil spring 48 for pulling down the lever is interposed between the hold down lever 47 and the lateral plate 31. A tension spring force of the tension coil spring 48 is set to be larger than a spring force of the coil spring 43.

In addition, a lever 49 for controlling an elevation position is fixed on the supporting shaft 46. The lever 49 controls an elevation position of the engaging shaft 44 elevated by the hold down lever 47. The lever 49 is used for setting an elevation position of the feeler shaft 35 and the feeler 37 for a lens frame as well as an elevation position of the feeler 38 for the lens frame. The lever 49 for controlling an elevation position is extended in a same direction as the hold down lever 47.

In addition, an actuator motor 50 is disposed on a lower side of the lever 49 for controlling an elevation position. The actuator motor 50 includes a motor main body 50a fixed to the lateral plate 31. The actuator motor 50 also includes a shaft 51 protruding towards an upside from the motor main body 50a and disposed with its shaft line parallel to the feeler shaft 35. A position control lever 49 comes into contact with an upper end of the shaft 51 by the tension spring force of the tension coil spring 48.

A DC motor or the like is used as the actuator motor 50. In addition, when the actuator motor is rotated normally, the shaft 51 advances upwardly. When the actuator motor is rotated reversely, the shaft 51 moves downwardly.

In addition, the coil spring 43, the supporting shaft 46, the hold down lever 47, the tension coil spring 48, the lever 49 for controlling an elevation position and the actuator motor 50 or the like constitute the elevator mechanism of the feeler 37 and the feeler 38.

A constitution of the system for measurement, driving and calculation control in the eyeglass frame shape-measuring apparatus of the embodiment 1 is described based on FIG. 10A hereinbelow.

Figure 10A:
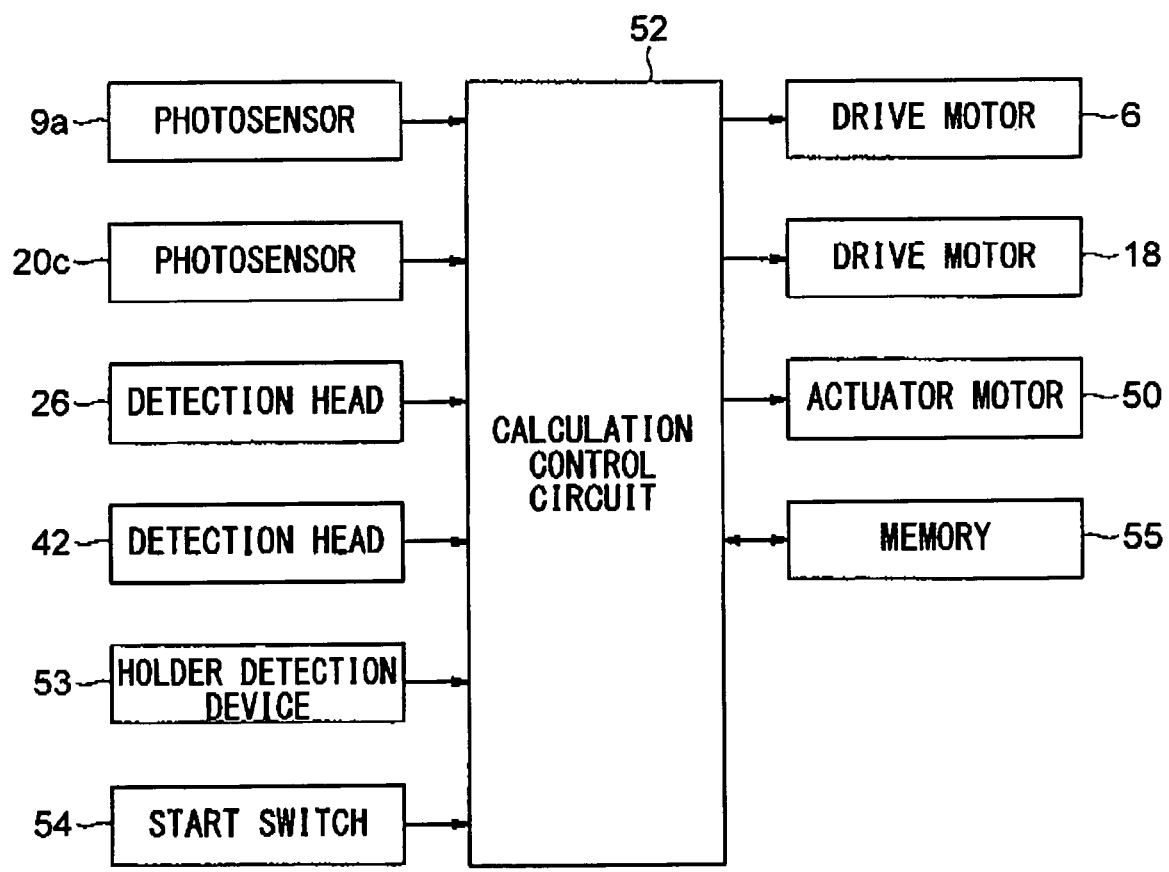
FIG. 10A is a control block diagram illustrating a system for measurement, driving and calculation control of the eyeglass frame shape-measuring apparatus of the embodiment 1.

As illustrated in FIG. 10A, in the system for measurement, driving and calculation control, a detection signal from the photosensor 9a of an original point position corresponding to a horizontal position of the rotational base 9 and a detection signal from the photosensor 20c of an original point position corresponding to a movement of the slider 15 are inputted to a calculation control circuit 52. In addition, a detection signal of a slider movement amount from the detection bead 26 of the linear scale 24 and a detection signal of a Z shaft movement amount from the detection head 42 of the linear scale 40 are inputted to the calculation control circuit 52.

As illustrated in FIG. 1, a holder detection device 53 is disposed on a side wall of the slide frame 3 and 3 situated at one side. A micro switch or the like is used for the holder detection device 53. As illustrated in FIG. 10A, a detection signal from the holder detection device 53 is inputted to the calculation control circuit 52. In addition, as illustrated in FIG. 10A, a switch signal from a start switch 54 for starting measurement is also inputted to the calculation control circuit 52.

The calculation control circuit 52 includes a motor drive circuit which converts a control command value to a motor drive current. The calculation control circuit 52, in correspondence to the control command value, drive-controls the drive motor 6 that drives the rotational base 9, the drive motor 18 for use in the above described slider movement and the actuator motor 50 that moves the feeler 37 and the feeler 38 upwardly and downwardly within a control range of an elevation position. Furthermore, a memory 55 for recording necessary data is connected to the calculation control circuit 52 to be capable of reading out writings.

Figure 11:
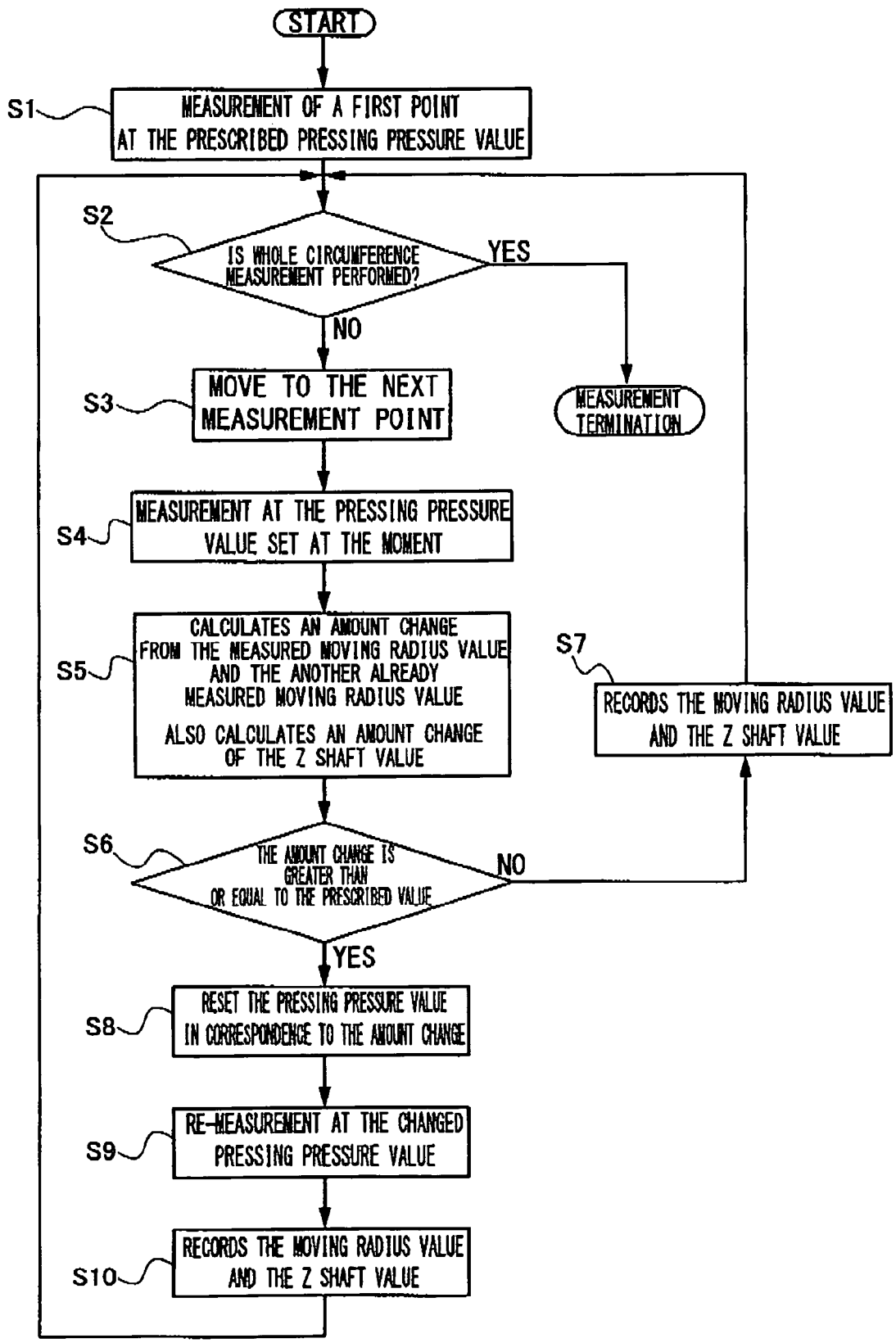
FIG. 11 is a flow chart that illustrates a flow of a control process implemented in a calculation control circuit 52 that measures and calculates a lens frame shape of the eyeglass frame shape-measuring apparatus of the embodiment 1.

FIG. 11 is a flow chart that illustrates a flow of a control process implemented in the calculation control circuit 52 that measures and calculates a lens frame shape of the eyeglass frame shape-measuring apparatus of the embodiment 1. Each step is described hereinbelow (a control device for measuring and calculating a lens frame shape). In a step S1, a switch signal is inputted from a start switch 54 for starting measurement. When preparation of a lens frame shape measurement is over, a moving radius value and a Z shaft value at a first point, that is, a first measurement point are measured at a preliminarily set prescribed pressing pressure value and then the control process proceeds to step S2. Hereby in the embodiment 1, the "prescribed pressing pressure value" is set according to a measurement speed. With regard to the measurement speed, the faster the speed, the larger is a resistance to a movement during a slide movement so that the higher the pressing pressure value is applied by the feeler 37 for a lens frame pressing against a lens frame. In addition, the "preliminarily set prescribed pressing pressure" is set to a value of a comparatively faster part of the measurement speed because as many lens frames as possible need to be measured in a short period of time. However, the measurement speed is slowed in correspondence in the case where the prescribed pressing pressure value is too high.

In the step S2, in continuation to the measurement of the first point at the step S1, it is determined whether a measurement of a moving radius and a Z shaft value around a whole circumference of the lens frame is over or not. In the case of YES (the whole circumference measurement is over), the control process switches over to measurement termination. In the case of NO (the whole circumference measurement is not over), the control process switches over to a step S3.

In the step S3, in continuation to the determination in the step S2 of the whole circumference measurement being not over, rotation is performed for a portion of a prescribed amount and movement to a next measurement point is performed. The control process then switches over to a step S4. When moving to the next measurement point, it is moved at a pressing pressure value set a previous time.

In the step S4, in continuation to moving to the next measurement point in the step S3, a moving radius value and a Z shaft value are measured at the pressing pressure value set the previous time. The control process then switches over to a step S5.

In the step S5, in continuation of the measurement in the step S4 by the pressing pressure value set the previous time, an amount change of a moving radius value is calculated from a measured moving radius value and an already measured moving radius value. In addition, an amount change of a Z shaft value is calculated from a measured Z shaft value and an already measured Z shaft value. The control process then switches over to a step S6. Hereby the calculation method of the amount change of the moving radius value and the amount change of the Z shaft value can be a comparison between the value measured at the step S4 and a value just before the value measured at the step S4 or a comparison between all measurement values extended back to a few points before including the value measured at the step S4 and an average value of any a few points already measured previously. In addition, the value of the amount change (the moving radius value and the Z shaft value) can be represented directly by a difference of numerical values or calculated as a slope.

In the step S6, in continuation to the calculations of the amount change of the moving radius value and the amount change of the Z shaft value in the step S5, the amount change calculated in the step S5 is compared to a preliminarily set prescribed value (a target value for comparison). When the amount change is less than the prescribed value, the control process switches over to a step S7 when the amount change is greater than or equal to the prescribed value, the control process switches over to a step S8. Hereby a comparison is made between the amount change of the moving radius value and a prescribed value of the amount change of the moving radius value. Another comparison is made between the amount change of the Z shaft value and another prescribed value of the amount change of the Z shaft value. When the comparisons are both determined to be less than the prescribed values, the control process switches over to the step S7 in which a pressing pressure value is not changed. When at least one amount change is determined to be greater than or equal to one of the prescribed values, the control process then switches over to the step S8 in which the pressing pressure value is changed.

In the step S7, in continuation to the determination in the step S6 that the amount changes are less than the prescribed values, the moving radius value and the Z shaft value measured at the step S4 are recorded together with a rotational angle information that indicates a measurement point. The control process then returns to the step S2.

In the step S8, in continuation to the determination in the step S6 that the amount change is greater than or equal to the prescribed value, increasing or decreasing directions of the moving radius value and the Z shaft value are determined. A pressing pressure value is reset in correspondence to a size of the amount change. The control process then switches over to a step S9. During resetting of the pressing pressure value, a case in which the pressing pressure value exceeds an optimum value (or optimum range) leads to a deformation of the frame. In addition, a case in which the pressing pressure value is less than the optimum value (or optimum range) leads to a drop off of the feeler during a measurement. Therefore, the pressing pressure value is controlled to an optimum value. Hereby for the optimum value, optimum value data is obtained preliminarily by an experiment or the like. A pressing pressure value table is developed from the optimum value data. The pressing pressure value table is preliminarily recorded in a memory that is capable of writing. In addition, in the embodiment 1, a change of the pressing pressure value by resetting is performed by a change in measurement speed in which the measurement speed is slowed. Therefore, the pressing pressure value table developed using the optimum value is set in detail using a combination of the amount change of the moving radius value, the increasing or decreasing directions of the moving radius value and the measurement speed. The pressing pressure value table developed using the optimum value is set in detail also using a combination of the amount change of the Z shaft value, the increasing or decreasing directions of the Z shaft value and the measurement speed. Therefore, the measurement speed is selected based on the respective amount change, the respective change direction and the respective pressing pressure value table (when one measurement speed is calculated, the one measurement speed is selected, when two measurement speeds are calculated, the slower measurement speed is selected). The selected measurement speed becomes the pressing pressure value by resetting.

In the step S9, in continuation to resetting in the step S8 the pressing pressure value in correspondence to the amount change, a moving radius value and a Z shaft value of a measurement point with the amount change determined to be greater than or equal to the prescribed value are measured again using the reset pressing pressure value. The control process then switches over to a step S10. That is, in the step S6, in the case the amount change is determined to be greater than or equal to the prescribed value, then the eyeglass frame can be considered to be easily deformable so that measurement speed thereafter is set to be slow.

In the step S10, in continuation to the re-measuring in the step S9 using a changed pressing pressure value, the re-measured moving radius value and Z shaft value are recorded together with information of a rotational angle that indicates a measurement point. The control process then returns to the step S2.

Next, operations are described. The operations of the eyeglass frame shape-measuring apparatus of the embodiment 1 are classified into, firstly, "preparatory operations of a lens frame shape measurement", secondly, "operations of a lens frame shape measurement of a not easily deformable glass frame" and thirdly, "operations of a lens frame shape measurement of an easily deformable glass frame" and described according to the classifications.

[Preparatory Operations of a Lens Frame Shape Measurement]

In the eyeglass frame shape-measuring apparatus of the embodiment 1, before performing measurement of a lens frame shape of an eyeglass frame or measurement of a shape of a lens frame of a demo lens, as illustrated in FIG. 6 through FIG. 8, the upper end of the shaft 51 of the actuator motor 50 should be set to a lowest end position (bottom dead point). At this position, the hold down lever 47 is rotatably urged by the tension coil spring 48 with a stronger spring force than the coil spring 43 to rotate with the supporting shaft 46 as the center towards a lower side. Herewith the hold down lever 47 pushes down the feeler shaft 35 towards the lower side via the engaging shaft 44. Herewith the feeler 37 for a lens frame and the feeler 38 for a lens frame are set to lowest end positions.

In the case a lens frame shape measurement of an eyeglass frame is performed using the eyeglass frame shape-measuring apparatus in such a state, for example, as described in JP H10-328992A, an eyeglass frame MF having a left lens frame LF and a right lens frame RF is disposed between the slide frame 3 and 3 of FIG. 1 (illustration of the eyeglass frame MF is abbreviated in FIG. 1) so that the lens frame LF (RF), as illustrated in FIG. 7, is sandwiched between the holding stick 3$b$1 and 3$b$2. This holding is the same to that of JP H10-328992A.

In addition, the lens frame LF (RF) held between the holding stick 3$b$1 and the holding stick 3$b$2, as illustrated in FIG. 7, in a state before the start of a measurement, is set to have an upper position than the feeler 37 for the lens frame. That is, the feeler 37 for the lens frame is disposed at an initial position ($\alpha$) situated at a lower side of the lens frame LF (RF). In addition, as illustrated in FIG. 7, the feeler 37 for the lens frame and the feeler 38 for the lens frame are disposed in correspondence to an initial position (i) situated at an approximate center of the lens frame LF (RF) held between the holding stick 3$b$1 and the holding stick 3$b$2.

At this position, the following state is achieved. The photosensor 9$a$ detects an original point of a horizontal rotation of the rotational base 9 from light beams emitted from the light emitting device 9$b$. Besides, the original point sensor 20$a$ detects an original point of a movement position of the slider 15.

In addition, even in the case the lens frame is curved in a three dimensional direction, a holding part held by the holding stick 3$b$1 and 3$b$2 of the lens frame is set to a lowest height in comparison to other parts. At the holding part, a height of a V-shaped groove Ym of the lens frame LF(RF) also becomes the set height which is a position B for starting lens frame shape measurement.

When a start switch 54 as illustrated in FIG. 10A is turned ON from this state, the calculation control circuit 52 rotates normally the actuator motor 50 and makes the shaft 51 to proceed upwardly for a predetermined amount (move-up) from the position illustrated in FIG. 6 through FIG. 8. At this moment, the shaft 51 lifts upwardly for a predetermined amount a free end part of the lever 49 for controlling an elevation position against the spring force of the tension coil spring 48.

Accompanying this, the hold down lever 47 rotates integrally with the supporting shaft 46 with its free end part moving upwardly for a predetermined amount. Due to the move up of the free end part of the hold down lever 47, the engaging shaft 44 is moved upwardly by the spring force of the coil spring 43 tracking the free end part of the hold down lever 47 so that the feeler shaft 35 is moved upwardly for a predetermined amount.

The upward moving amount of the feeler shaft 35, that is, the upward moving amount or the upward proceeding amount of the shaft 51 due to the actuator motor 50 is equal to an amount L in which a tip end of the feeler 37 for the lens frame moves upwardly from the initial position (α) to a height (β) facing a V-shaped groove Ym of the above described position B for starting shape measurement.

Then the calculation control circuit 52 drive controls the drive motor 18 to rotate the drive pulley 19 and move the slider 15 along the guide rail 14 by the wire 20 illustrated in FIG. 2 and FIG. 5B. In this case, the slider 15 is moved in a direction of an arrow A1 of FIG. 7. This movement is performed until the tip end of the feeler 37 for the lens frame comes into contact with the V-shaped groove Ym at the position B for starting shape measurement. In addition, under the above state in which the tip end of the feeler 37 for the lens frame comes into contact with the V-shaped groove Ym, the feeler 37 for the lens frame actually elastically comes into contact with the V-shaped groove Ym by the spring force of the coil spring 23. The drive motor 18 is stopped in such a state.

In addition, in the case the tip end of the feeler 37 for the lens frame comes into contact with the V-shaped groove Ym, a load applied to the drive motor 18 is enlarged so that a current circulating the drive motor 18 is enlarged. By detecting the current changes, the fact that the tip end of the feeler 37 for the lens frame has come into contact with the V-shaped groove Ym can be detected so that the drive motor 18 can be stopped.

Thereafter the calculation control circuit 52 furthermore rotates normally the actuator motor 50 and makes the shaft 51 to proceed upwardly for a predetermined amount (move-up). At this moment, the shaft 51 lifts upwardly for a predetermined amount the free end part of the lever 49 for controlling an elevation position against the spring force of the tension coil spring 48.

Accompanying this, the hold down lever 47 rotates integrally with the supporting shaft 46 with its free end part moving upwardly for a predetermined amount. The free end part of the hold down lever 47 is seceded from the engaging shaft 44 for a predetermined amount so that the feeler shaft 35 becomes possible to move in an upward and downward direction (Z shaft direction).

[Operations of a Lens Frame Shape Measurement of a Not Easily Deformable Eyeglass Frame]

When the above preparatory operations of a lens frame shape measurement are over, the calculation control circuit 52 drive-controls the drive motor 6 and rotates normally the drive motor 6. The rotation of the drive motor 6 is transferred to the driven gear 5 via the pinion 7 and the timing belt 8 so that the driven gear 5 is rotated horizontally in integration to the rotational base 9 (refer to FIG. 5A).

Accompanying the rotation of the rotational base 9, the slider 15 and a number of parts disposed on the slider 15 rotate horizontally in integration to the rotational base 9. Besides, the tip end of the feeler 37 for the lens frame moves in sliding contact along the V-shaped groove Ym.

At this moment, rotational operations of the rotational base 9 are an intermittent rotation that repeats rotations of a portion of a prescribed amount according to a set measurement speed and divides a whole circumference of the V-shaped groove to a plurality of measurement points. Then the tip end of the feeler 37 for the lens frame is pressure pressed to the V-shaped groove Ym at each measurement point while a moving radius value $\rho n$ and a Z shaft value Zn are measured so that together with a rotational angle $\theta n$, three dimensional lens frame shape information ($\theta n$, $\rho n$, Zn) is obtained and the lens frame shape is measured. In addition, the moving radius value $\rho n$ is a distance from a moving radius center O to an edge of an internal side of a frame trim (refer to FIG. 12). In addition, the Z shaft value Zn is a displacement amount of the moving radius center O of a direction orthogonal to the moving radius direction (refer to FIG. 13).

Hereby for example, operations of a lens frame shape measurement of a not easily deformable lens frame of a thickened width plastic or the like are described. Such an eyeglass frame has a property such that even if whole circumference measurement is performed at a prescribed pressing pressure value set by values of a comparatively faster side of measurement speed, an amount change of a moving radius value and an amount change of a Z shaft value can be suppressed to below the prescribed value.

In this case, during measurement of a first point, with reference to the flow chart illustrated in FIG. 1, a measurement process proceeds in an order of step S1→step S2→step S3→step S4→step S5→step S6→step S7. In the step S7, a moving radius value $\rho 1$ of the first point and a Z shaft value Z1 are recorded together with a rotational angle $\theta 1$ that indicates the measurement point.

Then from a measurement of a second point to when a whole circumference measurement is over, with reference to the flow chart illustrated in FIG. 11, a process flow that proceeds in an order of step S2→step S3→step S4→step S5→step S6→step S7 is repeated for the number of set measurement points while a fast measurement speed due to the preliminarily set prescribed pressing pressure value is maintained. In the step S7, a moving radius value $\rho n$ and a Z shaft value Zn of each point are recorded together with a rotational angle $\theta n$ that indicates a measurement point. Then when the whole circumference measurement is over, with reference to the flow chart illustrated in FIG. 11, the measurement process proceeds from the step S2 to an end of measurement so that the lens frame shape measurement is terminated.

Hereby acquisition of information of the moving radius value $\rho n$ is described. First, during the lens frame shape measurement, the slider 15 moves along the guide rail 14 and integrally with the feeler 37 for the lens frame. Therefore, a movement amount of the slider 15 when the slider 15 is moved from an original point position is the same to a movement amount of a tip end of the feeler 37 for the lens frame. The movement amount is calculated by the calculation control circuit 52 from a detection signal of the detection head 26 of the linear scale 24. Besides, a dimension (length) from a center of the feeler shaft 35 to the tip end of the feeler 37 for the lens frame is already known. Therefore, when the slider 15 is at the original point, if a distance from a rotational center of the rotational base 9 to the tip end of the feeler 37 for the lens frame is preliminarily set, even in the case the distance from the rotational center of the rotational base 9 to the tip end of the feeler 37 for the lens frame is changed when the slider 15 is moved along the guide rail 14, the distance changes can be set as the moving radius value $\rho n$.

Therefore, a rotational angle $\theta n$ of the rotational base 9 due to rotations of the drive motor 6 is calculated from a driving pulse number of the drive motor 6 and a moving radius value $\rho n$ corresponding to the rotational angle $\theta n$ is calculated so that shapes of a circumferential direction of the V-shaped groove Ym of the lens frame LF(RF) (lens frame shape) can be calculated as lens frame shape information ($\theta n$, $\rho n$) of a circular cylindrical coordinates format.

In addition, when the tip end of the feeler 37 for the lens frame moves in sliding contact along the V-shaped groove Ym, if the lens frame LF(RF) is curved in upward and downward directions, the curved state towards the upward and downward directions is calculated by the calculation control circuit 52 from a detection signal of the detection head 42 of the linear scale 40 as a displacement amount in upward and downward directions. The displacement amount towards the upward and downward directions becomes the Z shaft value Zn.

Therefore, during lens frame shape measurement of a not easily deformable glass frame, the whole circumference measurement can be finished at a prescribed pressing pressure value in which a value of a side of a comparatively fast measurement speed is adopted so that three dimensional lens frame shape information ($\theta n$, $\rho n$, Zn) of a lens frame shape of the lens frame LF(RF) can be obtained in a short time.

[Operations of a Lens Frame Shape Measurement of an Easily Deformable Eyeglass Frame]

Figure 12:
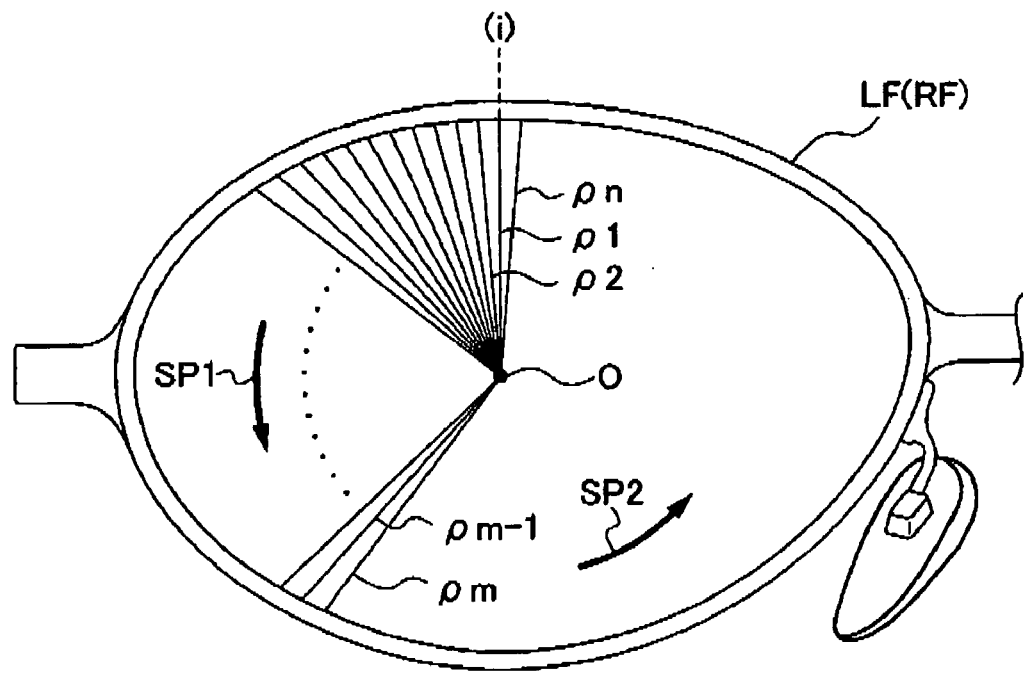
FIG. 12 is a functional schematic diagram that illustrates measurement operations of a moving radius value within measurement of a lens frame shape of an easily deformable glass frame by the eyeglass frame shape-measuring apparatus of the embodiment 1.
Figure 13:
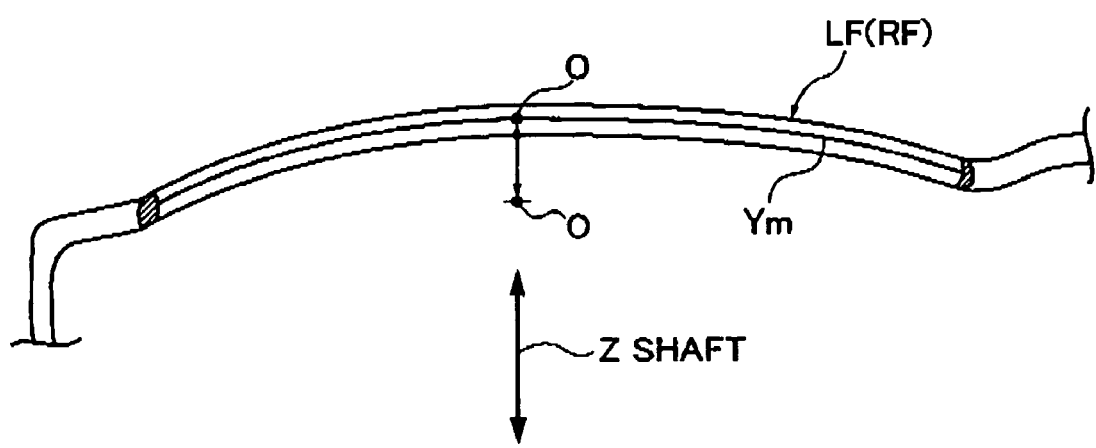
FIG. 13 is a functional schematic diagram that illustrates measurement operations of a Z value within measurement of a lens frame shape of an easily deformable glass frame by the eyeglass frame shape-measuring apparatus of the embodiment 1.

FIG. 12 is a functional schematic diagram that illustrates measurement operations of a moving radius value within measurement of a lens frame shape of an easily deformable eyeglass frame by the eyeglass frame shape-measuring apparatus of the embodiment 1. FIG. 13 is a functional schematic diagram that illustrates measurement operations of a Z value within measurement of a lens frame shape of an easily deformable eyeglass frame by the eyeglass frame shape-measuring apparatus of the embodiment 1.

For example, as described in JP3695988B as a conventional eyeglass frame shape-measuring apparatus, a method is known to predict moving radius changes of a non-measured part and control a drive motor so that a pressing pressure can be changed. However, this method is fine in the case if the moving radius of the unmeasured part changes as predicted. But as variety of shapes of eyeglass frames has recently emerged, there are cases in which the moving radius changes in a direction that differs from prediction. In such cases, it is possible that the pressing pressure changes in a direction that reversely deforms the eyeglass frame so that shape measurement is not correctly done.

In addition, conventionally, measurement speed (=rotational speed) during measurement is set constantly so that during a normal state, the measurement speed is set comparatively fast because more frames must be measured in a short time. In this case, because an eyeglass frame or the like with a thin rim is easily deformable, the measurement speed must be set slower by judgments of a measurer so that operations become burdensome.

That is, in the case of a lens frame shape measurement of an easily deformable eyeglass frame, there is a requirement of a precise lens frame shape measurement not based on predictions because there is possibility that correct shape measurement can not be done based on the predictions. In addition, in the case of a lens frame shape measurement of an easily deformable eyeglass frame, there is a requirement that no burdensome setting changes of the measurement speed by operations of the measurer shall be necessary and simple operations need to be realized by automatic changes of the measurement speed.

The inventors of the present invention propose the eyeglass frame shape-measuring apparatus of the embodiment 1 in correspondence to the above requirements. For example, in the case a whole circumference measurement needs to be performed for an easily deformable eyeglass frame of a thin rim or the like at a prescribed pressing pressure value in which a value of a side of a comparatively fast measurement speed is adopted, operations of the lens frame shape measurement of the eyeglass frame are described hereinbelow in which amount changes of a moving radius value and amount changes of a Z shaft value are suppressed to below the prescribed value.

In this case, during measurement of a first measurement point, with reference to the flow chart illustrated in FIG. 11, a measurement process proceeds in an order of step S1→step S2→step S3→step S4→step S5→step S6→step S7. In the step S7, a moving radius value $\rho 1$ of the first point and a Z shaft value Z1 are recorded together with a rotational angle $\theta 1$ that indicates the measurement point.

Then from a measurement of a second point to when a measurement of a (m−1)th point is over, with reference to the flow chart illustrated in FIG. 11, a measurement process flow that proceeds in an order of step S2→step S3→step S4→step S5→step S6→step S7 is repeated until the measurement of the (m−1) point is over while a fast measurement speed due to the preliminarily set prescribed pressing pressure value is maintained. In the step S7, a moving radius value of each point ($\rho 2$, . . . , $\rho m-1$) and a Z shaft value of each point (Z2, . . . , Zm−1) are recorded together with a rotational angle ($\theta 2$, . . . , $\theta m-1$) that indicates a measurement point.

Then the measurement process enters a measurement of a (m) point. With reference to the flow chart illustrated in FIG. 11, the measurement process proceeds in an order of step S2→step S3→step S4→step S5→step S6. In the step S6, a comparison is made between an amount change of a moving radius value (for example, $|\rho m - \rho_{m-1}|$) and the prescribed value of the amount change of the moving radius value. Another comparison is made between an amount change of a Z shaft value (for example, $|Zm - Z_{m-1}|$) and the prescribed value of the amount change of the Z shaft value. When at least one amount change is determined to be greater than the prescribed value, the measurement process then proceeds from the step S6 towards a step S8→a step S9→a step S10. In the step S8, increasing or decreasing directions of the moving radius value and the Z shaft value are determined and a pressing pressure value is reset in correspondence to the size of the amount change. In the step S9, using the reset pressing pressure value, a moving radius value $\rho m$ and a Z shaft value Zm of a measurement point (point m or the (m)th point) with the amount change determined to be greater than or equal to the prescribed value are re-measured. In the step S10, the re-measured moving radius value $\rho m$ and the Z shaft value Zm are recorded together with a rotational angle $\theta m$ that indicates a measurement point.

Then the measurement process returns to the step S2 in which the measurement speed is slowed by the pressing pressure value reset in the step S8. With reference to the flow chart illustrated in FIG. 11, the measurement process then proceeds in an order of step S2→step S3→step S4→step S5→step S6. Then measurement of a (m+1)th point is performed at the step S4. Then from the measurement of the (m+1)th point to when a measurement of a final n point is finished, if a determination of an amount change being less than the prescribed value is maintained at the step S6, the measurement speed remains slowed according to the pressing pressure value reset at the step S8, with reference to the flow chart illustrated in FIG. 11, a measurement process flow that proceeds from step S2→step S3→step S4→step S5→step S6→step S7 is repeated until the measurement of the final point is finished. In the step S7, a moving radius value of each point ($\rho m+1$, . . . , $\rho n$) and a Z shaft value of each point (Zn+1, . . . , Zn) are recorded together with a rotational angle ($\theta m+1$, . . . , $\theta n$) that indicates a measurement point.

Therefore, during lens frame shape measurement of an easily deformable eyeglass frame, a comparison is made between an actual measurement value, that is, an amount change of a moving radius value and a prescribed value of the amount change of the moving radius value. Another comparison is made between an actual measurement value, that is, an amount change of a Z shaft value and a prescribed value of the amount change of the Z shaft value. When at least one amount change is determined to be greater than or equal to the prescribed value, increasing or decreasing directions of the moving radius value and the Z shaft value are determined and a pressing pressure value is reset in correspondence to the size of the amount change. In such a way, the pressing pressure value is reset using the actual measurement value but not according to predictions so that including the cases in which the moving radius value and the Z shaft value change in a direction that differs from prediction, the requirement of a precise lens frame shape measurement can be satisfied.

In addition, in the case of a lens frame shape measurement of an easily deformable eyeglass frame, for example, as illustrated in FIG. 12, from the moving radius value $\rho 1$ of the first point to the moving radius value $\rho m-1$ of the (m-1)th point, shape measurement is performed at a comparatively fast measurement speed SP1 according to the preliminarily set prescribed pressing pressure value. During measurement of the (m)th point, the measurement speed is automatically switched over to a measurement speed SP2 slower than the first measurement speed SP1 so that moving radius values are measured at the measurement speed SP2 from the moving radius value $\rho m$ of the (m)th point until the moving radius value $\rho n$ of the final point. In such a way, burdensome operations of setting changes of the measurement speed performed by a measurer are not required so that changes of the measurement speed are performed automatically and the requirement of realizing a simple operation can be satisfied.

Furthermore, during the comparisons between the amount changes and the prescribed values at the step S6, the comparison is made between the amount change of the moving radius value and the prescribed value of the amount change of the moving radius value. The another comparison is made between the amount change of the Z shaft value and the prescribed value of the amount change of the Z shaft value. When at least one amount change is determined to be greater than or equal to the prescribed value, the increasing or decreasing direction of the moving radius value or the Z shaft value is determined so that the pressing pressure value is reset according to the size of the amount change. Therefore, even in the case where the lens frame has a shape easily deformable in the moving radius direction or the Z shaft direction, deformations of the lens frame shape can be detected certainly.

Next, effects are described. The eyeglass frame shape-measuring apparatus of the embodiment 1 can obtain the effects listed hereinbelow.

(1) The eyeglass frame shape-measuring apparatus that measures a shape of a lens frame of an eyeglass frame MF includes a feeler 37 for a lens frame that measures a direction of a moving radius of the lens frame LF (RF), a drive motor 6 for applying a certain amount of pressing pressure to the feeler 37 for the lens frame as well as a control device (FIG. 11) for measurement and calculation of the shape of the lens frame. The control device separates a whole circumference of the shape of the lens frame into a plurality of measuring points and obtains as frame shape information ($\theta n$, $\rho n$, $Zn$) frame shape values ($\rho n$, $Zn$) measured at each measuring point by moving the feeler 37 for the lens frame so that the feeler 37 is in sliding contact along the shape of the lens frame. The control device compares a frame shape value at one measuring point with an already measured frame shape value and determines an amount of pressing pressure in correspondence to an amount change of a frame shape detected at the one measuring point. In the case where the pressing pressure value differs from a preliminarily set pressing pressure value, the control device resets the pressing pressure value and measures again the frame shape at the already measured measuring point. Therefore, deformation of the frame shape is determined at each measurement point based on the actual measurement values so that precise measurement of the lens frame shape of the eyeglass frame MF can be performed even for the cases in which the frame shape changes in a direction that differs from prediction.

(2) The control device (FIG. 11) for measurement and calculation of the shape of the lens frame records the already measured frame shape values (step S7) in the case where the amount change of the frame shape at one measurement point is less than the prescribed value (NO at the step S6) and moves to the next measurement point while maintaining the pressing pressure value set at the moment (step S3). In the case the amount change of the frame shape of the one measurement point is greater than or equal to the prescribed value (YES at the step S6), the control device resets the pressing pressure value in correspondence to the size of the amount change of the frame shape (step S8) and re-measures the frame shape at the already measured measurement point according to the reset pressing pressure value (step S9). Then the control device records the frame shape value obtained by re-measurement (step S10) and moves to the next measurement point while maintaining the reset pressing pressure value (step S3). In such a way, the reset of the pressing pressure value and the re-measurement of the frame shape value are performed only when the amount change of the frame shape of the one measurement point is greater than or equal to the prescribed value. As long as the amount change of the frame shape of the one measurement point is less than the prescribed value, the pressing pressure value set at the moment is still maintained so that measurement precision of the lens frame shape can be improved while at the same time measurement of the lens frame shape can be done in a short time.

(3) The control device (FIG. 11) for measurement and calculation of the shape of the lens frame moves to the measurement point (step S3) and measures by the pressing pressure value set at the moment the moving radius value $\rho m$ and the Z shaft value Zm orthogonal to the moving radius direction (step S4). The control device calculates the amount change of the moving radius value from the measured moving radius value $\rho m$ and the another already measured moving radius value $\rho m-1$ as well as the amount change of the Z shaft value from the measured Z shaft value Zm and the another already measured Z shaft value Zm-1 (step S5). The control device includes an amount change comparison part that compares respectively the calculated amount change of the moving radius value with the prescribed value and the calculated amount change of the Z shaft value with the prescribed value (step S6). Therefore, even in the case where the shape of the lens frame LF (RF) is easily deformable in the moving radius direction or the Z shaft direction, deformation of the lens frame shape can be detected certainly.

(4) In the control device (FIG. 11) for measurement and calculation of the shape of the lens frame, setting changes of the pressing pressure value are settings performed by changes in the measurement speed. The control device includes a pressing pressure value reset part that changes the measurement speed in correspondence to the size of the amount change of the frame shape (step S8) when the amount change of the frame shape of one measurement point is greater than or equal to the prescribed value (YES at the step S6). Therefore, burdensome operations of setting changes of the measurement speed by a measurer become unnecessary but changes of the measurement speed are performed automatically so that an eyeglass frame shape-measuring apparatus having a simple operation can be realized.

(5) The pressing pressure value reset part (the step S8 of FIG. 11) preliminarily sets a pressing pressure value table that combines the amount change of the frame shape, the increasing or decreasing direction of the frame shape value and the measurement speed so that a most appropriate pressing pressure value without the frame deformation or the drop off of the feeler can be determined. When the amount change of the frame shape of one measurement point is greater than or equal to the prescribed value (YES at the step S6), the measurement speed is determined using the size of the amount change of the frame shape obtained from measurement data and the increasing or decreasing direction of the frame shape value obtained from the measurement data as well as the preliminarily set pressing pressure table. The measurement speed is then reset to the determined measurement speed. Therefore, in the case where the frame shape is determined to have deformation, the measurement speed after the measurement point determined to have deformation can be set to the measurement speed of a most appropriate pressing pressure without the frame deformation or drop off of the feeler. That is, even in the case of the measurement of the lens frame shape of the easily deformable eyeglass frame, the number of times of resetting of the pressing pressure value can be a minimum and the measurement of the lens frame shape can be finished in a short time.

(6) The control device (FIG. 11) for measurement and calculation of the shape of the lens frame includes a frame shape value re-measurement part that re-measures by the reset pressing pressure value the frame shape value of the measurement point with the amount change determined to be greater than or equal to the prescribed value (step S9). Therefore, the measurement of the lens frame shape can be finished in a short time while the number of re-measurement point is limited to a minimum.

(7) The control device (FIG. 11) for measurement and calculation of the shape of the lens frame includes an initial setting part for the prescribed pressing pressure value that performs initial settings of the prescribed pressing pressure value. That is, when starting lens frame shape measurement, the prescribed pressing pressure value is initially set to a comparatively high measurement speed in which the duration of the measurement terminates in a short time (step S1). Therefore, as long as the amount change of the frame shape of each measurement point is less than the prescribed value, the initially set prescribed pressing pressure value is still maintained so that in the case the eyeglass frame MF has a not easily deformable shape or is made of a not easily deformable material, the measurement of the lens frame shape can be finished in a short time.

The eyeglass frame shape-measuring apparatus of the present invention is described above based on the embodiment 1 but the specific constitutions are not limited to the embodiment 1. Design modifications and changes are allowed as long as they do not deviate from the scope of the invention set in each of the claims.

In the embodiment 1, an example of changing the measurement speed by the drive motor 6 is illustrated as an embodiment of the changes of the pressing pressure value. However, as other embodiments of the changes of the pressing pressure value, an example of changing a motor torque of the drive motor 6 can be adopted. Another example of changing simultaneously the motor torque of the drive motor 6 and the measurement speed can also be adopted. Furthermore, an example can be adopted in which the spring force applied to press the feeler 37 for the lens frame towards the lens frame can be changed by operations of the actuator.

In the embodiment 1, an example is illustrated in which the frame shape value re-measurement part (step S9) of the control device (FIG. 11) for measurement and calculation of the shape of the lens frame re-measures the frame shape value of the measurement point with the amount change determined to be greater than or equal to the prescribed value. However, the point to be measured can return to couple points before where re-measurement can be started from the couple points before under a state in which the measurement speed is slowed.

Furthermore, the point to be measured can return to the first point where re-measurement can be started from the first point under a state in which the measurement speed is slowed.

In the embodiment 1, an example is illustrated in which the initial setting part for the prescribed pressing pressure value of the control device (FIG. 11) for measurement and calculation of the shape of the lens frame performs initial settings of the prescribed pressing pressure value. That is, when starting lens frame shape measurement, the prescribed pressing pressure value is initially set to a comparatively high measurement speed in which the duration of the measurement terminates in a short time. However, in the case where an eyeglass frame is preliminarily known as being easily deformable, another example can be adopted in which the initial prescribed pressing pressure value is provided by a switch-over setting by a manual operation. In addition, partial preparatory measurements of one point through couple points are performed. Based on deformation information by the preparatory measurements, the initial prescribed pressing pressure value is provided by the manual switch-over setting or an automatic switch-over setting.

In the embodiment 1, an example is illustrated in which the frame shape value of any one point of the eyeglass frame is measured once and compared to an already measured frame shape value to detect shape deformations of the eyeglass frame. However, an example can be adopted to include a detection device that measures a plurality of times any one point of the eyeglass frame so that changes of the moving radius at the measurement points and shape deformations of the eyeglass frame can be detected.

Therefore, in the eyeglass frame shape-measuring apparatus of the present invention, when measuring the lens frame shape, a whole circumference of the lens frame shape is divided into a plurality of measurement points. The frame shape values at each measurement point measured by moving the feeler for the lens frame so that the feeler is in sliding contact along the lens frame shape are obtained as frame shape information. During the lens frame shape measurement, a comparison between the frame shape value at one measurement point and another already measured frame shape value is made in the control device for measurement and calculation of the shape of the lens frame. A pressing pressure value is determined in correspondence to the amount change of the frame shape detected at the one measurement point. In the case this pressing pressure value differs from a preliminarily set pressing pressure value, the pressing pressure value is reset and frame shape is re-measured at the already measured measurement point. As a result, deformation of the frame shape is determined at each measurement point based on the actual measurement values and even in the case where the frame shape changes in a direction that differs from prediction, measurement of the lens frame shape of the eyeglass frame can be performed precisely.

The above-described embodiment is only a representative embodiment of the present invention. The present invention is not limited to the above-described embodiment. That is, various modifications and changes can be made to the above embodiment within a range not deviating from the scope of the present invention.

What is claimed is:
1. An eyeglass frame shape-measuring apparatus that measures a shape of a lens frame of an eyeglass frame, comprising:
 a feeler for a lens frame that measures a direction of a moving radius of a lens frame;
 a drive motor that applies a certain amount of pressing pressure to the feeler for the lens frame, and
 a control device for measurement and calculation of the shape of the lens frame that separates a whole circum- ference of the shape of the lens frame into a plurality of measuring points and obtains as frame shape information frame shape values measured at each measuring point while the feeler for the lens frame is moved in sliding contact along the shape of the lens frame, wherein the control device compares a frame shape value at one measuring point with another already measured frame shape value and determines an amount of pressing pressure in correspondence to an amount change of a frame shape detected at the one measuring point, and the control device resets the pressing pressure value and measures again the frame shape at the another already measured measuring point in the case where the pressing pressure value differs from a preliminarily set pressing pressure value.

2. The eyeglass frame shape-measuring apparatus according to claim 1, wherein the control device for measurement and calculation of the shape of the lens frame records the already measured frame shape values in the case where the amount change of the frame shape at one measurement point is less than the prescribed value and moves to the next measurement point while maintaining the pressing pressure value set at the moment, the control device resets the pressing pressure value in correspondence to the size of the amount change of the frame shape and re-measures the frame shape at the already measured measurement point according to the reset pressing pressure value in the case the amount change of the frame shape of the one measurement point is greater than or equal to the prescribed value, and the control device then records the frame shape value obtained by re-measurement and moves to the next measurement point while maintaining the reset pressing pressure value.

3. The eyeglass frame shape-measuring apparatus according to claim 2, wherein:

the control device for measurement and calculation of the shape of the lens frame moves to the measurement point and measures by the pressing pressure value set at the moment the moving radius value and the Z shaft value orthogonal to the moving radius direction, and the control device calculates the amount change of the moving radius value from the measured moving radius value and the another already measured moving radius value as well as the amount change of the Z shaft value from the measured Z shaft value and the another already measured Z shaft value, and the control device further includes an amount change comparison part that compares respectively the calculated amount change of the moving radius value with the prescribed value and the calculated amount change of the Z shaft value with the prescribed value.

4. The eyeglass frame shape-measuring apparatus according to claim 2, wherein:

setting changes of the pressing pressure value in the control device for measurement and calculation of the shape of the lens frame are settings performed by changes in the measurement speed, and the control device further includes a pressing pressure value reset part that changes the measurement speed in correspondence to the size of the amount change of the frame shape when the amount change of the frame shape of one measurement point is greater than or equal to the prescribed value.

5. The eyeglass frame shape-measuring apparatus according to claim 3, wherein:

setting changes of the pressing pressure value in the control device for measurement and calculation of the shape of the lens frame are settings performed by changes in the measurement speed, and the control device further includes a pressing pressure value reset part that changes the measurement speed in correspondence to the size of the amount change of the frame shape when the amount change of the frame shape of one measurement point is greater than or equal to the prescribed value.

6. The eyeglass frame shape-measuring apparatus according to claim 4, wherein:

the pressing pressure value reset part, in order to determine a most appropriate pressing pressure value without frame deformations or drop offs of the feeler, preliminarily sets a pressing pressure value table that combines the amount change of the frame shape, the increasing or decreasing direction of the frame shape value and the measurement speed, the pressing pressure value reset part determines the measurement speed using the size of the amount change of the frame shape obtained from measurement data and the increasing or decreasing direction of the frame shape value obtained from the measurement data as well as the preliminarily set pressing pressure table when the amount change of the frame shape of one measurement point is greater than or equal to the prescribed value, and the pressing pressure value reset part then resets the measurement speed to the determined measurement speed.

7. The eyeglass frame shape-measuring apparatus according to claim 1, wherein:

the control device for measurement and calculation of the shape of the lens frame further includes a frame shape value re-measurement part that re-measures using the reset pressing pressure value the frame shape value of the measurement point with the amount change determined to be greater than or equal to the prescribed value.

8. The eyeglass frame shape-measuring apparatus according to claim 1, wherein:

the control device for measurement and calculation of the shape of the lens frame further includes an initial setting part for the prescribed pressing pressure value that performs initial settings of the prescribed pressing pressure value, and the initial setting part, when starting lens frame shape measurement, initially sets the prescribed pressing pressure value to a comparatively high measurement speed in which the duration of the measurement terminates in a short time.

* * * * *